United States Patent
Dasu et al.

(10) Patent No.: US 9,853,873 B2
(45) Date of Patent: Dec. 26, 2017

(54) DIAGNOSIS AND THROUGHPUT MEASUREMENT OF FIBRE CHANNEL PORTS IN A STORAGE AREA NETWORK ENVIRONMENT

(71) Applicant: CISCO TECHNOLOGY, INC., San Jose, CA (US)

(72) Inventors: Santa Dasu, Palo Alto, CA (US); Srinivas Pitta, Cupertino, CA (US); Venkata Ramana Talagadadeevi, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 355 days.

(21) Appl. No.: 14/594,108

(22) Filed: Jan. 10, 2015

(65) Prior Publication Data

US 2016/0205008 A1    Jul. 14, 2016

(51) Int. Cl.
*G06F 15/173* (2006.01)
*H04L 12/26* (2006.01)
*H04L 29/08* (2006.01)
*H04L 12/24* (2006.01)

(52) U.S. Cl.
CPC ...... *H04L 43/0888* (2013.01); *H04L 41/0853* (2013.01); *H04L 43/10* (2013.01); *H04L 43/50* (2013.01); *H04L 67/1097* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 7,222,255 B1 * | 5/2007 | Claessens | H04L 12/2697 709/224 |
| 7,433,326 B2 | 10/2008 | Desai et al. | |
| 7,558,872 B1 * | 7/2009 | Senevirathne | H04L 47/10 370/231 |
| 8,619,599 B1 * | 12/2013 | Even | H04L 43/50 370/242 |
| 2006/0045021 A1 * | 3/2006 | Deragon | H04L 1/243 370/249 |

(Continued)

OTHER PUBLICATIONS

Brocade Communication Systems, Inc., "San Fabric Administration Best Practices Guide Support Perspective," May 2013, 21 pages; http://www.brocade.com/downloads/documents/best_practice_guides/san-admin-best-practices-bp.pdf.

(Continued)

*Primary Examiner* — Mohamed Wasel
*Assistant Examiner* — Phyllis A Book
(74) *Attorney, Agent, or Firm* — Polsinelli LLP

(57) ABSTRACT

An example method for diagnosis and throughput measurement of FC ports in a SAN environment is provided and includes generating, by a control processor at a generator in the SAN, a control packet requesting a link test to be performed with a reflector in the SAN, sending the control packet to the reflector through a media access controller (MAC) of the generator, receiving, at the MAC of the generator, an acknowledgement from the reflector indicating ability to perform the requested link test, generating, at the MAC of the generator, a test data packet for the link test, performing the link test with the reflector, and analyzing, at the generator, network parameters based on results of the link test.

20 Claims, 9 Drawing Sheets

(56) References Cited

U.S. PATENT DOCUMENTS

| | | | |
|---|---|---|---|
| 2007/0211640 A1* | 9/2007 | Palacharla | H04L 12/2697 370/241 |
| 2011/0228679 A1* | 9/2011 | Varma | H04L 12/413 370/241 |
| 2014/0016493 A1* | 1/2014 | Johnsson | H04L 43/106 370/252 |
| 2014/0029441 A1 | 1/2014 | Nydell | |
| 2014/0029442 A1* | 1/2014 | Wallman | H04L 69/22 370/241.1 |
| 2014/0198794 A1* | 7/2014 | Mehta | H04L 45/74 370/392 |
| 2014/0269390 A1* | 9/2014 | Ciodaru | H04L 43/50 370/252 |
| 2015/0263993 A1* | 9/2015 | Kuch | H04L 49/354 709/225 |

OTHER PUBLICATIONS

Brocade Communication Systems, Inc., "Metro Cloud Connectivity: Integrated Metro SAN Connectivity in 16 Gbps Switches," Apr. 2011, 14 pages; http://www.hds.com/assets/pdf/data-center-integrated-metro-san-connectivity-in-16-gbps-switches.pdf.

Hedayat, et al., "A Two-Way Active Measurement Protocol (TWAMP)," Network Working Group, RFC 5357, Oct. 2008, 26 pages; https://tools.ietf.org/html/rfc5357.

\* cited by examiner

| FRAME BYTES | CONTENTS | | |
|---|---|---|---|
| 00-03 | START OF FRAME | | |
| 04-27 | FC HEADER (R_CTL=0x22, TYPE=0x22, SID/DID=0xFF:FC:<DOMAIN OF SRC/DEST>) | | |
| 28-31 | SW_ILS command_code=0x71000000 | | |
| 32-35 | EPP VERSION=1 | EPP COMMAND CODE (SYNC=1 COMMIT=2) | SESSION[15:0] |
| 36-43 | SWITCH WWN ( 8 BYTES) | | |
| 44-51 | RESERVED | | PAYLOAD LENGTH (WITHOUT FC HEADER) |
| | DIAGNOSTICS TLVs | | |
| | CRC | | |
| | END OF FRAME | | |

156

| FRAME BYTES | CONTENTS | |
|---|---|---|
| 00-03 | START OF FRAME | |
| 04-27 | FC HEADER (R_CTL=0x22, TYPE=0x22, SID/DID=0xFF:FC:<DOMAIN OF SRC/DEST> | |
| 28-31 | CFS SW_ILS command_code=0x77 43 46 53 | |
| 32-35 | CFC VERSION=1 | RESERVED |
| 36-43 | SOURCE SWITCH WWN | |
| 44-47 | DESTINATION SAP (FABRIC DIAGNOSTIC SAP) | |
| 48-51 | SOURCE SAP (FABRIC DIAGNOSTIC SAP) | |
| 52-55 | CFS COMMAND CODE (DATA:1, LOCK:2, COMMIT:3, REL:4 ..) | CFS MESSAGE TYPE (REQ:1, ACC:2, RJT:3) |
| 56-59 | AUTONOMOUS FABRIC ID | RESERVED |
| 60-63 | SEQUENCE NUMBER | |
| 64-67 | FRAGMENT ID | P:B:L BITS |
| 68-71 | REASON CODE | REASON CODE EXPL | RESERVED |
| 72-75 | RESERVED | |
| 76-79 | CFS OPTIONAL HEADER SIZE | RESERVED |
| 80- | CFS OPTIONAL HEADER TLVs | |
| | APPLICATION DATA SIZE AND TLVs | |
| | CRC | |
| | END OF FRAME | |

FIG. 10

| FRAME BYTES | CONTENTS |
|---|---|
| 00-03 | START OF FRAME |
| 04-27 | FC HEADER (R_CTL=0x03, TYPE=0x22, SID/DID=0xFF:FC:<DOMAIN OF SRC/DEST> |
| 28-31 | CFS SW_ILS command_code =0x02 00 00 00 (SW_ACC) |
| 32- | SIMILAR TO CFS REQUEST MESSAGE |
| | CRC |
| | END OF FRAME |

DIAGNOSIS AND THROUGHPUT MEASUREMENT OF FIBRE CHANNEL PORTS IN A STORAGE AREA NETWORK ENVIRONMENT

TECHNICAL FIELD

This disclosure relates in general to the field of communications and, more particularly, to diagnosis and throughput measurement of Fibre Channel (FC) ports in a storage area network (SAN) environment.

BACKGROUND

A SAN transfers data between computer systems and storage elements through a specialized high-speed Fibre Channel network. The SAN consists of a communication infrastructure, which provides physical connections. It also includes a management layer, which organizes the connections, storage elements, and computer systems so that data transfer is secure and robust. The SAN allows any-to-any connections across the network by using interconnect elements such as switches. The SAN introduces the flexibility of networking to enable one server or many heterogeneous servers to share a common storage utility. The SAN might include many storage devices, including disks, tapes, and optical storage. Additionally, the storage utility might be located far from the servers that use it.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 10 is a simplified block diagram illustrating yet other example details of embodiments of the communication system;

DETAILED DESCRIPTION OF EXAMPLE EMBODIMENTS

Overview

An example method for diagnosis and throughput measurement of FC ports in a SAN environment is provided and includes generating, by a control processor at a generator in the SAN, a control packet requesting a link test to be performed with a reflector in the SAN, sending the control packet to the reflector through a media access controller (MAC) of the generator, receiving, at the MAC of the generator, an acknowledgement from the reflector indicating ability to perform the requested link test, generating, at the MAC of the generator, a test data packet for the link test, performing the link test with the reflector, and analyzing, at the generator, network parameters based on results of the link test.

As used herein, the terms "generator" and "reflector" refer to hardware network elements including SAN switches, network appliances, routers, gateways, bridges, load balancers, or any other suitable device, component, element, or object operable to route and/or switch and exchange information in a SAN network environment. Moreover, the network elements may include any suitably configured hardware provisioned with suitable software, components, modules, interfaces, or objects that facilitate the operations thereof. This may be inclusive of appropriate algorithms and communication protocols that allow for the effective exchange of information.

Example Embodiments

Figure 1:
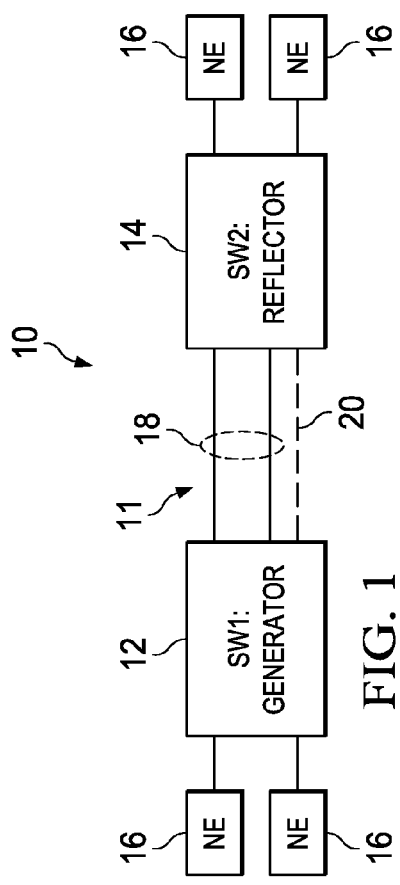
FIG. 1 is a simplified block diagram illustrating a communication system for diagnosis and throughput measurement of FC ports in a SAN environment.

Turning to FIG. 1, FIG. 1 is a simplified block diagram illustrating a communication system 10 for diagnosis and throughput measurement of FC ports in a SAN environment in accordance with one example embodiment. FIG. 1 illustrates a SAN 11 facilitating communication between a generator 12 and a reflector 14 and other network elements 16. In a general sense, the term "network element" is meant to encompass hardware components, including computers, network appliances, servers, routers, switches, gateways, bridges, load balancers, firewalls, processors, modules, or any other suitable device, component, element, or object operable to exchange information in a network environment.

Generator 12 and reflector 14 are directly connected (e.g., attached, linked, joined, coupled, etc.) with each other over one or more back-to-back links, with no intervening network elements in between them. As used herein, a "link" is a communications channel (e.g., information transfer path within a network) that connects two or more network elements. The link may be physical (e.g., cable) or it may be logical, using one or more physical links. For example, generator 12 and reflector 14 may be connected directly by links 18. In a back-to-back link, output from one network element, for example, generator 12, is connected to input of the other network element, for example, reflector 14, and vice versa. According to various embodiments, generator 12 and reflector 14 may be configured to verify FC link performance, throughput performance and other link characteristics in a new back-to-back link 20.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Fibre Channel (FC) is a high speed serial interface technology that supports several higher layer protocols including Small Computer System Interface (SCSI) and Internet Protocol (IP). FC is a gigabit speed networking technology primarily used in SANs. SANs include servers and storage (SAN devices being called nodes) interconnected via a network of SAN switches using FC protocol for transport of frames. The servers host applications that eventually initiate read and write operations (also called input/output (IO) operations) of data towards the storage. Before any IO operations can be executed, the nodes login to the SAN (e.g., through fabric login (FLOGI) operations) and then to each other (e.g., through port login (PLOGI) operations).

The data involved in IO operations originate as Information Units (IU) passed from an application to the transport protocol. The IUs are packaged into frames for transport in the underlying FC network. In a general sense, a frame is an indivisible IU that may contain data to record on disc or control information such as a SCSI command. Each frame comprises a string of transmission words containing data bytes. All frames include a 24 bytes-long frame header in addition to a payload (e.g., which may be optional, but normally present, with size and contents determined by the frame type). The header is used to control link operation and device protocol transfers, and to detect missing frames or frames that are out of order. Various fields and subfields in the frame header can carry meta-data (e.g., data in addition to payload data, for transmitting protocol specific information). One or more frames form a sequence and multiple such sequences comprise an exchange.

Turning to hardware components of FC switches, each front-panel port of the FC switch has an associated physical layer (PHY) device interface and a media access controller (MAC). In typical switches, the port is located in a separate line card module that can be plugged into the FC switch chassis and interconnected with FC switch hardware components, such as crossbar fabric and control processors. On ingress, the PHY converts optical signals received at the port into electrical signals, sending the electrical stream of bits into the MAC.

The primary function of the MAC is to decipher FC frames from the incoming bit stream by identifying start-of-frame and end-of-frame markers in the bit stream, and other FC signaling primitives. In conjunction with frames being received, the MAC communicates with forwarding and queuing modules of the line card of the corresponding port. Before forwarding any frame, the MAC prepends an internal switch header onto the frame, providing a forwarding module of the line card having the port with details such as ingress port, type of port, ingress virtual SAN (VSAN), frame quality of service (QoS) markings, and a timestamp of when the frame entered the FC switch. The MAC also checks that the received frame contains no errors by validating its cyclic redundancy check (CRC).

The egress PHY/MAC modules of the egress port process frames leaving the FC switch. Note that the same PHY/MAC modules can act as ingress for some frames and egress for other frames. Frames arriving into the egress PHY/MAC module from within the FC switch have their switch internal header removed. If the output port is a Trunked E_Port (TE_Port), an Enhanced ISL (EISL) header is prepended to the frame. The frame timestamp is checked, and if the frame has been queued within the FC switch for too long (e.g., according to FC standards), it is dropped. The frames are transmitted onto the cable of the egress port. The outbound MAC is responsible for formatting the frame into the correct encoding over the cable, and inserting appropriate frame delimiters and other FC primitives to the frame.

Typical FC switches include a cross bar (XBAR) that can provide low-latency, high-throughput, non-blocking, and non-over-subscribed switching capacity between line card modules. In some switch architectures, crossbar capacity is provided to each line card slot as a small number of high-bandwidth channels, for example to facilitate performance-optimized (e.g., non-blocking, non-over-subscribed) line cards and host-optimized (e.g., non-blocking, over-subscribed) line cards, multiprotocol (Small Computer System Interface over IP (iSCSI) and Fibre Channel over IP (FCIP)) and intelligent (e.g., storage services) line cards.

In typical FC switches, the XBAR is provisioned in a supervisor module separate from the line cards of the switches. The supervisor modules provide two essential switch functions: (1) they house the control-plane processors that manage the switch and keep the switch operational; and (2) they house the crossbar switch fabrics and central arbiters used to provide data-plane connectivity between all the line cards in the chassis. Besides providing crossbar switch fabric capacity, the supervisor modules do not generally handle any frame forwarding or frame processing. (Frame forwarding and processing are handled within the distributed forwarding application specific integrated chips (ASICs) on the line cards themselves.) In some switches, the crossbar switch fabrics are provisioned on separate fabric cards inserted into the rear of the switch chassis rather than on supervisor modules. Control-plane functionality on the supervisor modules is handled by appropriate processors and memory elements (e.g., internal flash memory, hard disks, etc.).

Turning to SANs in general, in the past, SANs were traditionally small networks with few switches and devices and the SAN administrators' troubleshooting role was restricted to device level analysis using tools provided by server and/or storage vendors (e.g., EMC Ionix Control Center™, HDS Tuning Manager™, etc.). In contrast, current data center SANs involve a large network of FC switches that interconnect servers to storage. With servers becoming increasingly virtualized (e.g., virtual machines (VMs)) and/or mobile (e.g., migrating between servers) and storage capacity requirement increasing exponentially, there is an explosion of devices that login into the data center SAN. The increase in number of devices in the SAN also increases the number of ports, switches, communication links and tiers in the network.

Larger SANs also involve additional complexity of management and troubleshooting. In addition to complex troubleshooting of heterogeneous set of devices from different vendors, the networking in large scale SANs include multi-tier switches that may have to be analyzed and debugged for SAN performance issues. One common problem faced by administrators is troubleshooting link performance in the SAN. The effort can involve identifying various traffic flows from the application in the SAN, segregating misbehaving flows and eventually identifying the misbehaving links in the SAN. With larger SANs, the troubleshooting can become a tedious manual process, prone to operator error.

Communication system 10 is configured to address these issues (among others) to offer a system and method for diagnosis and throughput measurement of FC ports in a SAN environment. According to various embodiments, generator 12 generates a control packet and transmits the control packet to reflector 14, the control packet indicating a test mode according to which reflector 14 configures itself. Generator 12 generates a test data packet, performs a link test according to the test mode using the test data packet, and calculates network parameters from the link test. The network parameters can include latency, frame throughput, cable length, jitter, link integrity, link speed, network load, etc.

In various embodiments, the test mode can be chosen according to the network parameter to be tested using the link test and vice versa. For example, to test for latency, the test mode can involve setting ingress and egress ports at reflector 14 in loopback mode, such that the switch fabric at reflector 14 is bypassed for incoming data packets over link 20. The loopback test can enable verifying connectivity of link 20. In another example, to test for throughput, the test mode can involve configuring the switch fabric at reflector 14 to forward incoming data packets to the egress port connected to link 20. Various other reflector configurations may be included according to the network parameters to be tested under the broad scope of the embodiments.

Embodiments of communication system 10 can enable a network administrator to diagnose FC connections across two switches and also across end-to-end switches in a multi-hop FC network. In some embodiments, the diagnosis is enabled by exchanging protocol messages between endpoints (e.g., servers and storage devices) to negotiate the diagnostics test type, duration and other such test information, including signaling start and end of suitable tests. Embodiments of communication system 10 can facilitate physical layer diagnosis, for example, by verifying frame throughput, cable length, and latency; preventive diagnosis, for example, by verifying link performance before adding the link to a port channel (or other such aggregated link topology); and predicting network load, for example, by measuring load on FC network 11 before adding a new host or storage device to FC network 11.

In example network 11 illustrated in FIG. 1, endpoints such as storage devices and servers are interconnected using at least generator 12 and reflector 14. The interconnection can be achieved using one or more physical links 18, for example, aggregated in a port-channel. To meet bandwidth requirements, or for other reasons, new physical link 20 may be added to the existing port channel. If new link 20 does not perform satisfactorily, the entire port channel performance, including link performance of existing links, can degrade. Generator 12 and reflector 14 may be suitably configured to diagnose new link 20 before deploying it in network 11 to, for example, avoid performance degradation in a live network (e.g., network that is exchanging data between endpoints).

According to various embodiments, generator 12 signals far-end reflector 14, for example, via appropriate control packets, to loopback packets arriving in a connecting port over new link 20. Upon receiving acknowledgement of generator 12's request, generator 12 configures its hardware to start test data packet (e.g., simulated data packet) generation for a certain period of time and/or certain number of test packets. Upon test completion, collected test results are used by generator 12 to make decisions regarding provisioning of new link 20.

In one example embodiment, generator 12 uses Exchange Peer Parameters Protocol (EPP) to signal reflector 14 for initiating the new link test. EPP is typically used by FC switches, such as generator 12 and reflector 14 to negotiate trunk mode, active VSAN list and other network parameters. EPP is also used as framework for other protocols such Peer Trunking Protocol (PTP), Port Channel Protocol (PCP) and Port Quiesce Protocol (PQP). EPP can also be used, according to embodiments of communication system 10, for communicating inter-switch link (ISL) diagnostics between FC switches, including generator 12 and reflector 14. A new extension for EPP according to various embodiments is referred to herein as Port Diagnostic Protocol (PDP). In an example embodiment, PDP has a value of 4 for protocol type.

Payload type-length-values (TLVs) used in the control packet sent from generator 12 to reflector 14 to initiate the link test includes EPP Payload TLVs. The control packet, comprising an EPP-PDP message is generated at generator 12 and is used to communicate various link tests and test modes to far-end reflector 14. The link test and test modes include diagnostic test start and stop time periods, and appropriate parameters for test setup and/or test execution on reflector 14. The EPP-PDP payload may include the following TLVs depending on the type of test: TestType: Latency|Traffic; TestCommand: Start|Stop; Test Duration: Number (e.g., indicating milliseconds); source identifier (SID): Fibre Channel ID (FCID) of source switch (e.g., generator 12); destination ID (DID): FCID of destination FC switch (e.g., reflector 14).

According to an example embodiment, when a start test command is given on generator 12 (e.g., manually through command line interface (CLI) instructions, or automatically through triggering of test upon link connection, etc.) generator 12 generates and sends a control packet comprising an EPP protocol message to far-end reflector 14. According to various embodiments, the link test can be executed routinely, or automatically, for example, as part of link bring-up and/or link provisioning. In other embodiments, the link test may be initiated upon user command, or invoked by a user initiated configuration command.

In one embodiment, the link test can be initiated by a user (e.g. a network administrator) through an application accessed on an administrative workstation such as a computer system that is connected to generator 12. The application may include one or more user interfaces, such as CLIs or graphical user interfaces (GUIs) that enable the user to identify link 20 intended to be diagnosed and to turn on a diagnostic mode. Turning on the diagnostic mode may automatically trigger the operations described herein on generator 12 and reflector 14 that are connected by identified link 20. In one embodiment, the user is able to decide which diagnostic tests to run on identified link 20. After the diagnostic tests have been performed, the result may be presented to the user for further analysis.

Assume, merely for example purposes that the control packet indicates a latency test on new back-to-back link 20. Accordingly, far-end reflector 14 puts a MAC on the PHY interface on which the message is received in Serdes loopback for the latency test. In the loopback test, reflector 14 sends the received signals (e.g., test data packets) back to generator 12. In some embodiments, reflector 14 may rewrite frame headers to indicate a changed source and destination for the test data packets before sending them back to generator 12. Reflector 14 also starts a timer, and sends an acknowledgement back to generator 12. When the EPP-PDP protocol exchange is successful (e.g., generator 12 receives the acknowledgement), test data packet generation is started on generator 12.

Note that EPP-PDP protocol exchange may be unsuccessful for a variety of reasons, such as: lack of software support at reflector 14 to support EPP-PDP protocol; lack of hardware support at reflector 14's port for the requested test (e.g., loopback test); reflector 14 is already running another diagnostic test; etc. If the protocol exchange fails for any reason, the link test is not started. In some embodiments, reserved Fabric Channel Identifiers (FCIDs) of source FCID=0xffff13 and destination FCID=0xffff14 may be used for Serdes loopback tests, for example, to enable proper routing of generated and received frames within the FC switch hardware functional blocks. Simulated traffic tests can be initiated with various payload patterns up to 100% of link capacity. In some example embodiments, simulated traffic tests may use encapsulation of source FCID=0xffff15 and destination FCID=0xffff16 to distinguish them from other user FC traffic, for example, so that test packets can be routed appropriately.

Turning to the infrastructure of communication system 10, the network topology can include any number of initiators, targets, servers, hardware accelerators, virtual machines, switches (including distributed virtual switches), routers, and other nodes inter-connected to form a large and complex network. Network 11 represents a series of points or nodes of interconnected communication paths for receiving and transmitting packets and/or frames of information that are delivered to communication system 10. A node may be any electronic device, printer, hard disk drive, client, server, peer, service, application, or other object capable of sending, receiving, or forwarding information over communications channels in a network, for example, using FC and other such protocols. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Network 11 offers a communicative interface between targets (e.g., storage devices) and/or initiators (e.g., hosts, servers, etc.), and may include any local area network (LAN), wireless local area network (WLAN), metropolitan area network (MAN), Intranet, Extranet, WAN, virtual private network (VPN), or any other appropriate architecture or system that facilitates communications in a network environment and can provide lossless service, for example, similar to (or according to) Fibre Channel over Ethernet (FCoE) protocols. Network 11 may implement any suitable communication protocol for transmitting and receiving data packets within communication system 10. The architecture of the present disclosure may include a configuration capable of TCP/IP, FC, FCoE, and/or other communications for the electronic transmission or reception FC frames in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In some embodiments, a communication link may represent any electronic link supporting a LAN and/or SAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Figure 2:
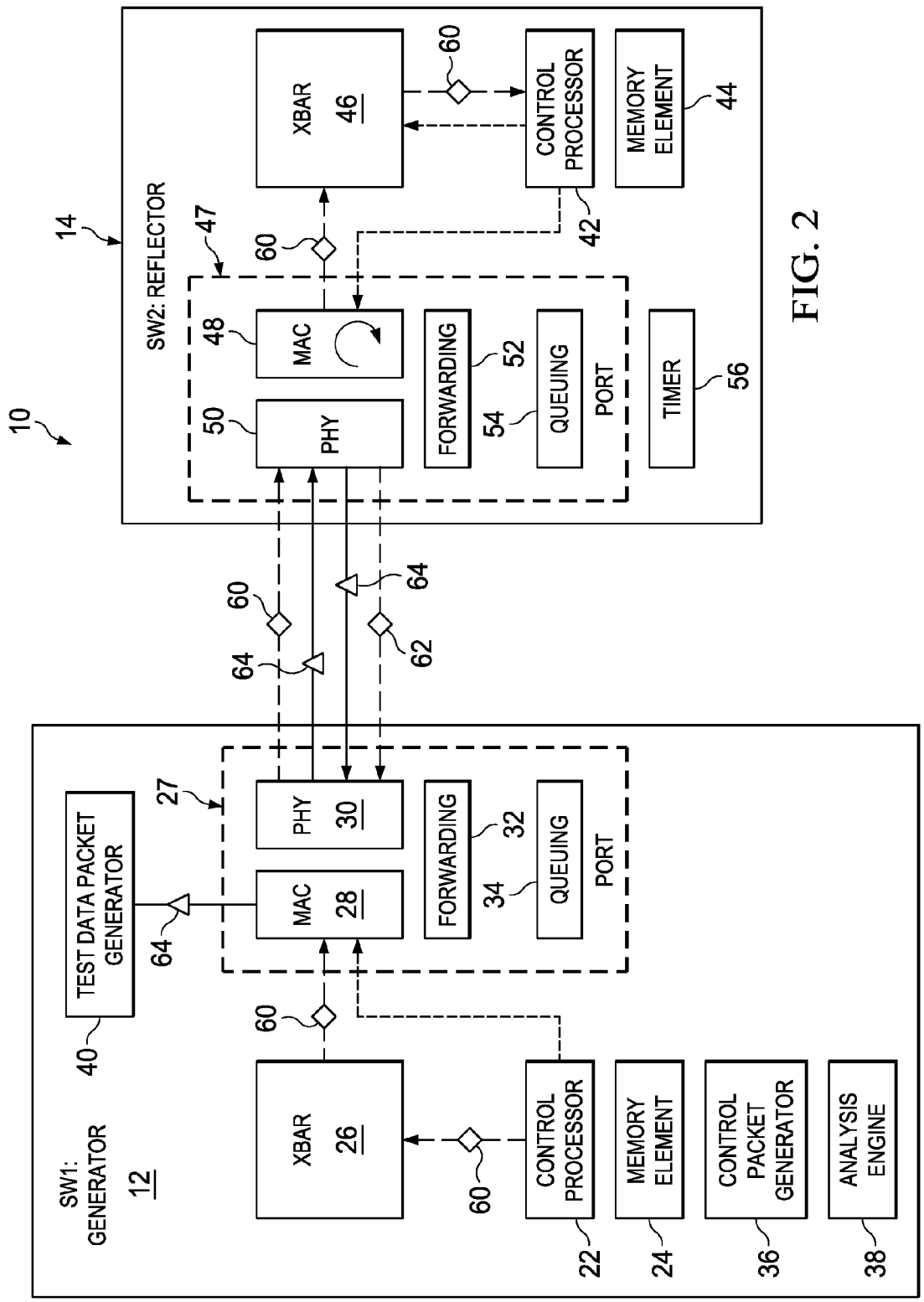
FIG. 2 is a simplified block diagram illustrating example details of embodiments of the communication system.

Turning to FIG. 2, FIG. 2 is a simplified block diagram illustrating example details of an embodiment of communication system 10. Example generator 12 includes a control processor 22 and a memory element 24. Control processor 22 may be connected to a XBAR 26. In some embodiments, control processor 22, memory element 24 and XBAR 26 may be provisioned in a single supervisor module of generator 12. In other embodiments, control processor 22 and memory element 24 may be provisioned in the supervisor module and XBAR 26 may be provisioned in a separate fabric card of generator 12. XBAR 26 may communicate with a port 27. Port 27 includes a MAC 28, a PHY 30, a forwarding module 32 and a queuing module 34. Generator 12 includes a control packet generator 36, an analysis engine 38, and a test data packet generator 40. In some embodiments, control packet generator 36 and analysis engine 38 may be implemented in an ASIC on generator 12, or otherwise integrated with control plane functionalities to use control processor 22 for performing various operations. In one embodiment, test data packet generator 40 is implemented in MAC 28.

Example reflector 14 includes a control processor 42 and a memory element 44. Control processor 42 may be connected to a XBAR 46. In some embodiments, control processor 42, memory element 44 and XBAR 46 may be provisioned in a single supervisor module of reflector 14. In other embodiments, control processor 42 and memory element 44 may be provisioned in the supervisor module and XBAR 46 may be provisioned in a separate fabric card of reflector 14. XBAR 46 may communicate with a port 47. Port 27 includes a MAC 48, a PHY 50, a forwarding module 52 and a queuing module 54 Reflector 14 can also include a timer 56.

Note that although generator 12 and reflector 14 are shown as having separate and different modules, the modules are based on the respective functionalities. Each of generator 12 and reflector 14 may include modules of the other when performing the corresponding operations. For example, generator 12 may function as reflector 14 under certain situations, and vice versa. In such instances, the switch shown as reflector 14 may include modules of the switch shown as generator 12, and vice versa.

Note that each port 27 and 47 can comprise line cards that plug into or are otherwise connected to generator 12 and reflector 14, respectively. In various embodiments, MAC 28 and MAC 48 provide respective interfaces between incoming/outgoing data signals and internal switch signals (e.g., to the SAN fabric). MAC 28 and MAC 48 are integrated circuits connected to respective PHY 30 and 50. MAC 28 and MAC 48 include processing units capable of processing at 1, 2, 4 or 10 Gbps and support various FC ports, such as F_Port, Loop Port (FL_Port), Private Loop (TL_Port), ISL (E_Port), EISL (TE_Port), SPAN Port (SD_Port). PHY 30 and 50 include hardware components including (or connected to) optical to electrical transceivers (e.g., small form factor pluggable optics at 1, 2 or 4 Gbps line rate). In some embodiments, MAC and PHY (e.g., MAC 28 and PHY 30, or MAC 48 and PHY 50) may be integrated into a single hardware component (e.g., single-chip integrated circuit) connected to appropriate transceivers.

Merely as an example to describe certain functions of the various modules of ports 27 and 47, consider port 47 at reflector 14. At ingress, PHY 50 performs CRC error checking of the ingress frame, performs ingress rate limiting, prepends switch internal header (e.g., ingress port, ingress VSAN, QoS bits, etc.), and timestamps ingress frame arrival time. Forwarding module 52 looks up hard zoning rules (e.g., per-VSAN ingress access control lists (ACLs)), FC/multi-protocol label switching (MPLS) forwarding rules (e.g., per-VSAN), determines final egress interface according to load balancing algorithms (e.g., equal cost fabric shortest path first (FSPF), PortChannel hash, etc.) and performs FC network address translation (FC NAT). Queuing module 54 queues frames destined to egress ports according to various virtual queues and other buffering algorithms before forwarding the frame to XBAR 46.

At egress, forwarding module 52 receives frames from XBAR 46, looks up hard zoning rules (e.g., per VSAN egress ACLs), revalidates frame CRC, performs egress QoS, and FC NAT. PHY 50 and MAC 48 transmits, loopbacks or expires frames according to the appropriate forwarding instructions from forwarding module 52 and ingress timestamp, removes switch internal header from the outgoing frame, and prepends other appropriate headers (e.g., EISL header if egress port is a TE_Port) to the frame. Note that although the ingress and egress operations are described with respect to reflector 14, similar operations are performed by the corresponding modules and components of generator 12.

According to various embodiments, during operation, control packet generator 36 generates a control packet 60, for example, comprising an EPP-PDP message. Control processor 22 forwards control packet 60 to XBAR 26, which forwards it to MAC 28. MAC 28 adds appropriate headers, etc. Control packet 60 is sent out through MAC 28 and PHY 30 over the link under test (e.g., new link 20) to reflector 14. PHY 50 at reflector 14 receives control packet 60 and MAC 48 forwards it to XBAR 46. XBAR 46 identifies the incoming packet as a control packet and forwards control packet 60 to control processor 42. Control processor 42 analyzes control packet 60 and provides configuration instructions to XBAR 46 and MAC 48. For example, MAC 48 may be configured for Serdes loopback for a latency test, bypassing XBAR 46. In one embodiment, XBAR 46 may configure MAC 48 according to the test mode and other configuration options provided in control packet 60 from generator 12. In another embodiment, control processor 42 may directly configure MAC 48, without involving XBAR 46.

Reflector 14 sends an acknowledgement packet 62 (e.g., according to EPP) back to generator 12. Control processor 22 at generator 12 configures MAC 28 to generate test data packets when acknowledgement packet 62 is received indicating that reflector 14 can perform the requested link test. Test data packet generator 40 at MAC 28 generates a test data packet (e.g., simulated data packet) 64. PHY 30 forwards test data packet 64 to reflector 14, at which it is received by PHY 50. Assume, merely for example purposes, that the requested link test is a latency test, in which MAC 48 is configured in loopback mode. Thus, MAC 48 may rewrite frame headers appropriately and send out test packet 64 through PHY 50 back to generator 12, without forwarding test data packet 64 to XBAR 46. Timer 48 may time the time taken at reflector 14 and include the information in test data packet 64 returned to generator 12. For example, MAC 48 may timestamp test data packet 64 before sending it out.

Test data packet 64 is received at PHY 30 of generator 12. Various parameters are parsed and extracted from test data packet 64 by PHY 30 and MAC 28 and forwarded to analysis engine 38. Analysis engine 38 at generator 12 analyzes information in returned test data packet 64 and computes latency over the link under test, and other network parameters as appropriate.

Figure 3:
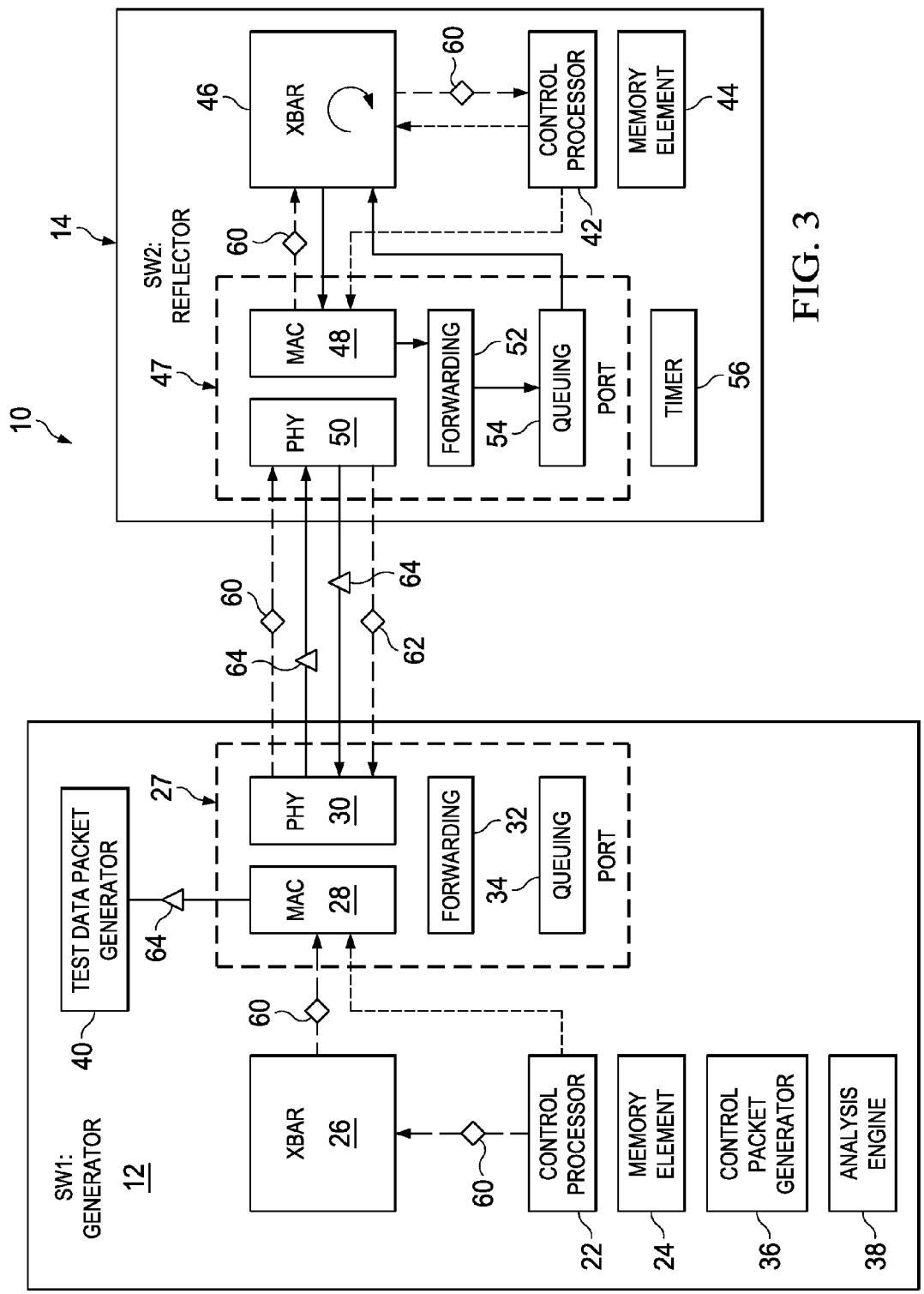
FIG. 3 is a simplified block diagram illustrating other example details of embodiments of the communication system.

Turning to FIG. 3, FIG. 3 is a simplified block diagram illustrating example details of an embodiment of communication system 10. Assume, merely for example purposes that the requested link test in control packet 60 is a throughput test over the back-to-back link between generator 12 and reflector 14. For example, control packet generator 36 generates control packet 60, comprising an EPP-PDP message indicating the throughput test. Control processor 22 forwards control packet 60 to XBAR 26, which forwards it to MAC 28. MAC 28 adds appropriate headers, etc. Control packet 60 is sent out through MAC 28 and PHY 30 over the link under test to reflector 14. PHY 50 at reflector 14 receives control packet 60 and MAC 48 forwards it to XBAR 46. XBAR 46 identifies the incoming packet as a control packet and forward control packet 60 to control processor 42. Control processor 42 analyzes control packet 60 and provides configuration instructions to XBAR 46. Accordingly, control processor 42 at reflector 14 configures XBAR 46 to loopback test data packets to port 47 on which test data packets would be received from generator 12 during the link test.

Reflector 14 sends acknowledgement packet 62 (e.g., according to EPP) back to generator 12. Control processor 22 at generator 12 configures MAC 28 to generate test data packets when acknowledgement packet 62 is received indicating that reflector 14 can perform the requested link test. Test data packet generator 40 generate test data packet 64 at MAC 28. PHY 30 forwards test data packet 64 to reflector 14, at which it is received by PHY 50. MAC 48 forwards test data packet 64 to forwarding module 52, which sends it to queuing module 54, and subsequently test data packet 64 is forwarded to XBAR 46. XBAR 46 loopbacks test data packet to MAC 48 according to its configured settings. MAC 48 rewrites frame headers appropriately and send out test packet 64 through PHY 50 back to generator 12. Timer 48 may time the time taken at reflector 14 and include the information in test data packet 64 returned to generator 12. For example, MAC 48 may timestamp test data packet 64 before sending it out.

Test data packet 64 is received at PHY 30 of generator 12. Various parameters are parsed and extracted from test data packet 64 by PHY 30 and MAC 28 and forwarded to analysis engine 38. Analysis engine 38 at generator 12 analyzes information in returned test data packet 64 and computes throughput over the link under test, and other network parameters as appropriate.

Figure 4:
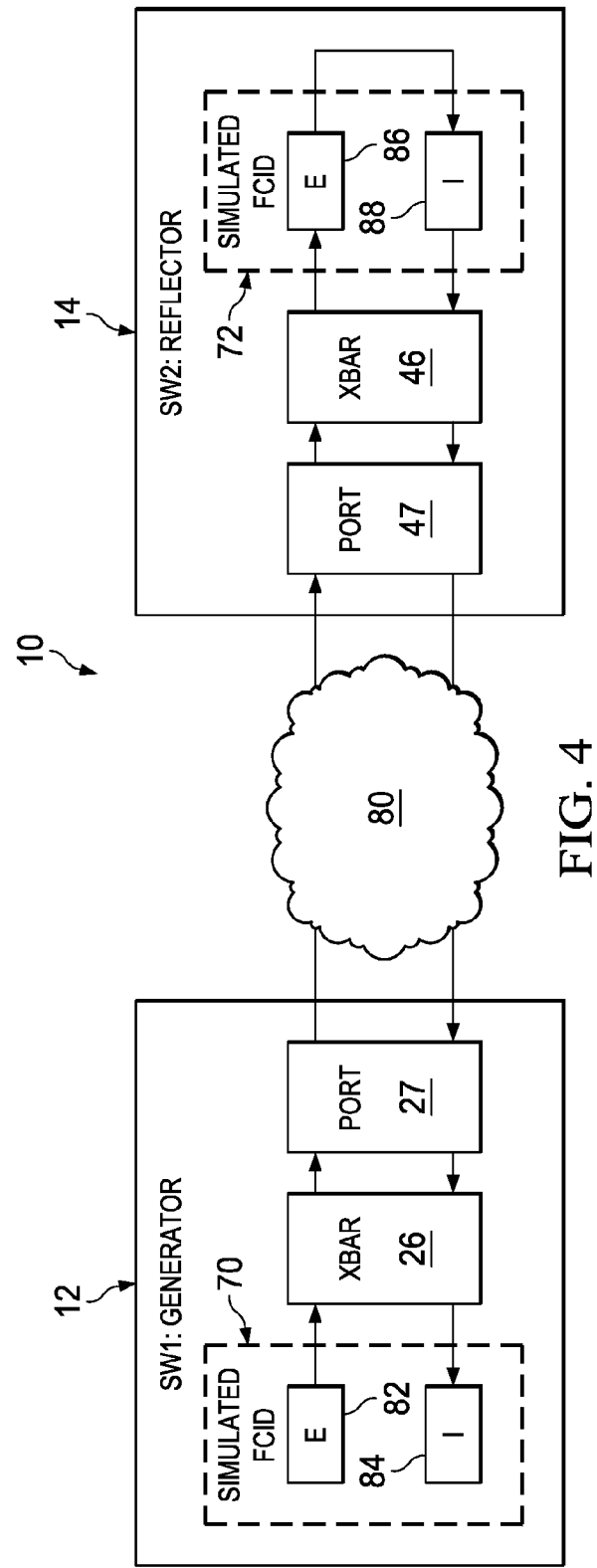
FIG. 4 is a simplified block diagram illustrating yet other example details of embodiments of the communication system.

Turning to FIG. 4, FIG. 4 is a simplified block diagram illustrating example details of an embodiment of communication system 10. In a general sense, FC switches including generator 12 and reflector 14 provide FCPING utilities to verify end to end connectivity between SAN devices.

However, simple connectivity verification may not be sufficient to ensure quality of service according to promised service level agreements. Embodiments of communication system 10 can enable more detailed testing, for example, to ensure quality of service according to promised service level agreements. In some embodiments of communication system 10, the SAN administrator can simulate load due to additional server/host to full capacity. Such a mechanism can help manage risks involved in adding storage devices and/or servers to the existing SAN and accurately predict network behavior. Note that although the operations are described herein according to a specific data protocol, the operations are extensible to any other data transport with corresponding choices of protocol and encapsulation. In a general sense, with appropriate hardware support for test packet generation, embodiments of communication system 10 can be deployed with predictable overall performance.

According to embodiments of communication system 10, link diagnostics can be performed across another network 80 that can include additional network elements, including the Internet. Such diagnostics can be used to diagnose and/or predict network problems in end-to-end connections (e.g., connections other than back-to-back links). For example, an egress port 82 and an ingress port 84 at generator 12 may face an endpoint, such as a new server being introduced into SAN 11. Similarly, an egress port 86 and an ingress port 88 at reflector 14 may face another endpoint, such as a storage device. In one embodiment, egress port 82 and ingress port 84 comprise simulated endpoints, with simulated FCID 70; likewise, egress port 86 and ingress port 88 comprise simulated endpoints with corresponding simulated FCID 72.

Traffic on a typical SAN arises from FC endpoints such as servers and storage devices. For the FC switches to forward traffic, the traffic must originate and terminate at legitimate endpoints (e.g., endpoints that have logged into the FC switches appropriately). In a general sense, when a SAN endpoint (e.g., host such as server or storage device) plugs into a FC switch, the host end is called an N_Port (Node Port), and the FC switch's interface is called an F_Port (Fabric Port). The host has a port world-wide name (pWWN), which is a 64-bit globally unique label (e.g., analogous to a Media Access Control address). When the N_Port is attached to the switch port F_Port, an extended link initiation procedure known as fabric login (FLOGI) is used. Note that in switched FC environments, such as in SAN 11, FLOGI accomplishes various tasks, including assigning, by the switch, an FCID (e.g., analogous to an IP address) to the requesting N_Port. The FCID is a 24-bit number, which is used appropriately in the source and destination fields of the frame header. The simulated FCID indicates a simulated endpoint that is presumed to be connected to the FC switch.

According to embodiments of communication system 10, FC switches at the two test endpoints simulate device FLOGIs. The simulated device FLOGIs acquire FCIDs (e.g., 70 and 72) and the acquired FCIDs are communicated throughout network 80, including SAN 11, using suitable FC routing protocol, such as Fabric Shortest Path First (FSPF). Subsequently, traffic can flow between the simulated device FLOGIs 70 and 72 over network 80. In some embodiments, appropriate hardware components of the FC switches including generator 12 and reflector 14 are used for traffic generation and local loopback of the traffic on the MACs.

Simulated FCIDs 70 and 72 are programmed into forwarding tables and other appropriate routing/switching tables in the various components of the respective FC switches. For example, XBAR 26 and 46 can correlate FCIDs 70 and 72, respectively, with certain ports (e.g., simulated ports) in the respective FC switches. MACs 28 and 48 can be programmed to insert simulated FCID 70 and 72 into appropriate frame headers (e.g., to indicate source and/or destination), and so on.

Generator 12 and reflector 14 can be multiple hops away in the SAN. Simulated endpoints 70 and 72 are used with appropriate communication protocols to start and stop the link tests. EPP protocol used in back-to back-ISL links cannot be used for the multi-hop diagnosis, in part because EPP is used when a new link is activated, whereas testing between endpoints multiple hops away use established links between FC switches. On the other hand, a suitable end to end communication protocol such as Cisco Fabric Services (CFS) can be extended for the link tests in some embodiments.

In a general sense, one or more of a set of devices connected through some kind of network fabric have features that can benefit from exchanging information (e.g., configuration information) with peer devices providing the same features. CFS comprises a protocol that allows configuration for a feature provided on one device to be propagated to all other devices in the fabric. CFS is typically used for exchange of configuration information between various FC switches in the SAN, enabling automatic configuration synchronization in the SAN. CFS is FC2 based peer-to-peer protocol with no client-server relationship at the CFS layer. The CFS protocol can ensure reliable transport with facilities for unicast or broadcast capabilities. CFS has the ability to discover CFS capable switches in the SAN and discover application capabilities in all such discovered CFS capable switches. According to various embodiments, CFS provides both uncoordinated distributions where multiple parallel distributions are allowed in the fabric and coordinated distributions where only one distribution is allowed in the fabric at any given time.

CFS distribution functionality is independent of the lower transport layer; CFS facilitates a layering abstraction where applications can register with CFS and exchange information with discovered peers without any particular knowledge of the underlying mode of transport. Typically, the logical scope of messaging with CFS is within one or more specific VSAN across the entire physical topology of the SAN. Within a defined distribution scope, an FC switch can use CFS to distribute its configuration information to its peers running on other platforms.

In a general sense, a feature supported in any particular device (e.g., FC switch) may or may not be CFS capable. If the feature is CFS capable, the control of the CFS operations is instrumented through a CFS infrastructure provisioned on the device. Applications providing the features register with the CFS infrastructure as service access points (SAPs) and communicate end-to-end. Any service built over CFS communicates end-to-end via the CFS infrastructure. Typically, the CFS capable feature can be enabled for data distribution within the fabric by the user via SNMP. After the CFS capable feature is enabled for data distribution, CFS operations can be performed for that particular feature.

The CFS message generally contains a field indicating that it includes data that should be sent throughout the fabric and an application field indicating the use of such data. In one embodiment, CFS is extended with a "Fabric Diagnostic Application" that can be used for communication between generator 12 and reflector 14. According to the embodiment, at least three different kinds of CFS packets are exchanged between generator 12 and reflector 14 for performing diagnostics of end-to-end connections: (1) CFS_REQ; (2)

CFS_ACC; and (3) CFS_RJT. CFS_REQ is sent by generator 12 to reflector 14 with CFS_CMD_CODE_DATA (0x01). In a general sense, the CFS_REQ packet is a unicast un-coordinated CFS message that can originate from any FC switch destined to any other FC switch within a specific VSAN.

Reflector 14 (e.g., the responding FC switch) typically responds with either an acknowledgement allowing (e.g., through a CFS_ACC message) or denying (e.g., through a CFS_RJT message) the CFS request based on whether reflector 14 can be programmed to loopback test data packets sent from given source pWWN destined to given destination pWWN. CFS_RJT may be sent due to any of the following reasons that do not permit the test mode specified in the CFS_REQ message, for example, reflector 14 does not support the loopback feature requested in hardware, or the requested feature cannot be enabled on the interface as it is in a shut state.

Embodiments of communication system 10 can facilitate verifying FC link performance in back-to-back connections and throughput analysis between end-to-end devices, among other network parameters. The protocol encapsulation exchanged between participating FC switches can provide a basis for the various messages exchanged between participating FC switches. In some embodiments, protocol encapsulation extends existing EPP protocol and CFS protocol to accomplish single-hop and multi-hop diagnosis, respectively.

Figure 5:
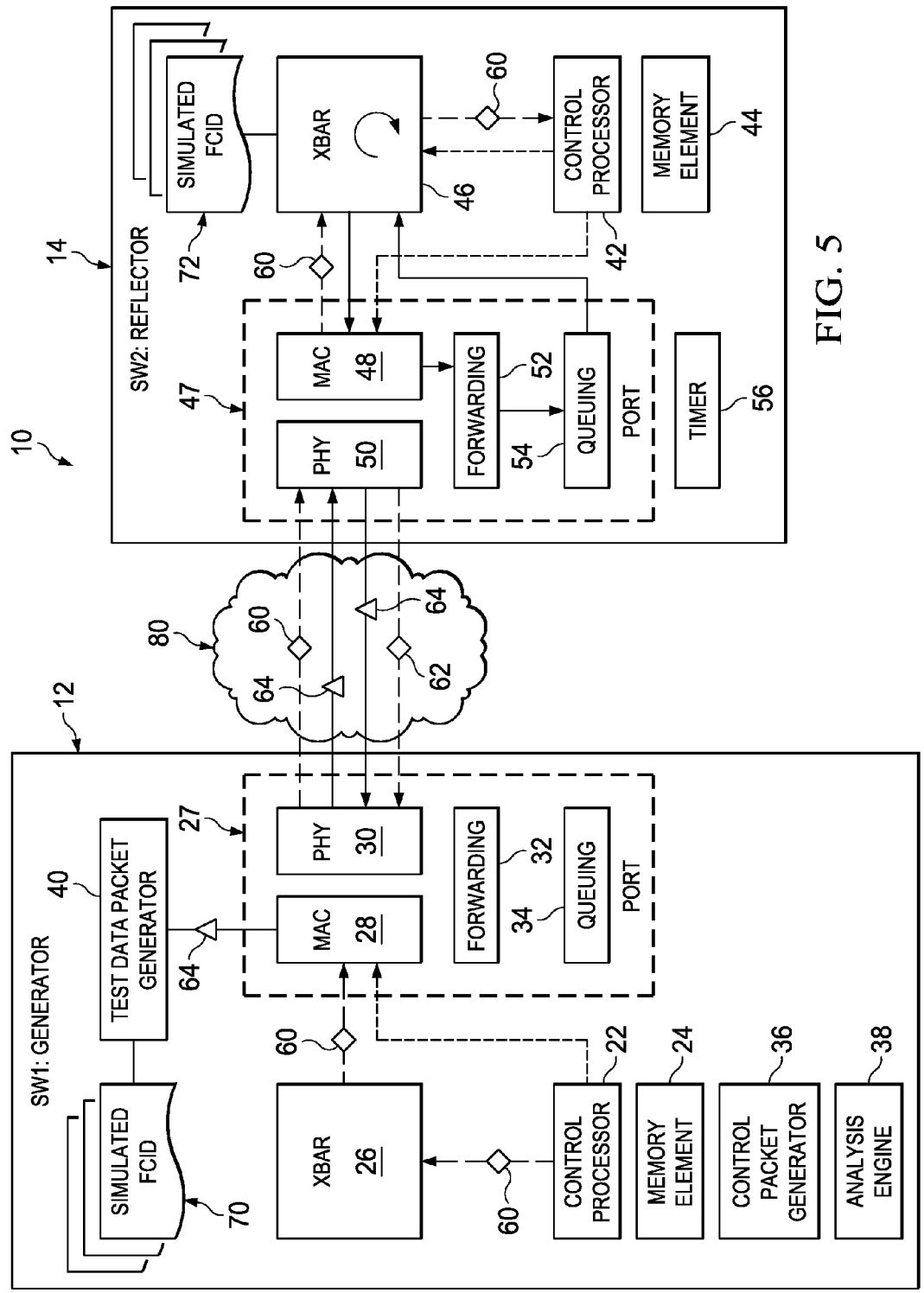
FIG. 5 is a simplified block diagram illustrating yet other example details of embodiments of the communication system.

Turning to FIG. 5, FIG. 5 is a simplified block diagram illustrating example details of an embodiment of multi-hop diagnosis in communication system 10. During operation, control packet generator 36 generates control packet 60, for example, comprising a CFS_REQ message indicating the end-to-end diagnostic test. The source service access point (SAP) in control packet 60 indicates simulated FCID 70, and destination SAP indicates FCID 72. Control processor 22 forwards control packet 60 to XBAR 26, which forwards it to MAC 28. MAC 28 adds appropriate headers, etc. Control packet 60 is sent out through MAC 28 and PHY 30 over network 80 to reflector 14. PHY 50 at reflector 14 receives control packet 60 and MAC 48 forwards it to XBAR 46. XBAR 46 identifies the incoming packet as a control packet and forwards control packet 60 to control processor 42. Control processor 42 analyzes control packet 60 and provides configuration instructions to XBAR 46. Accordingly, control processor 42 at reflector 14 configures XBAR 46 to loopback test data packets to port 47 inserting the simulated FCID 72 as the source address and simulated FCID 70 as the destination address in the test data packets before returning the test data packets back to generator 12.

Reflector 14 sends acknowledgement packet 62 (e.g., CFS_ACC message) back to generator 12. Control processor 22 at generator 12 configures MAC 28 to generate test data packets when acknowledgement packet 62 is received indicating that reflector 14 can perform the requested link test. Test data packet generator 40 generates test data packet 64 at MAC 28. MAC 28 inserts simulated FCID 70 as the source and simulated FCID 72 as the destination for test data packet 64. PHY 30 forwards test data packet 64 to reflector 14, at which it is received by PHY 50. MAC 48 forwards test data packet 64 to forwarding module 52, which sends it to queuing module 54, and subsequently test data packet 64 is forwarded to XBAR 46. XBAR 46 loopbacks test data packet to MAC 48 according to its configured settings, sending test data packet 64 back to MAC 48 as if from simulated FCID 72. MAC 48 rewrites frame headers appropriately and send out test packet 64 through PHY 50 back to generator 12. Timer 48 may time the time taken at reflector 14 and include the information in test data packet 64 returned to generator 12. For example, MAC 48 may timestamp test data packet 64 before sending it out.

Test data packet 64 is received at PHY 30 of generator 12. Various parameters are parsed and extracted from test data packet 64 by PHY 30 and MAC 28 and forwarded to analysis engine 38. Analysis engine 38 at generator 12 analyzes information in returned test data packet 64 and computes throughput over the link under test, and other network parameters as appropriate.

Figure 6:
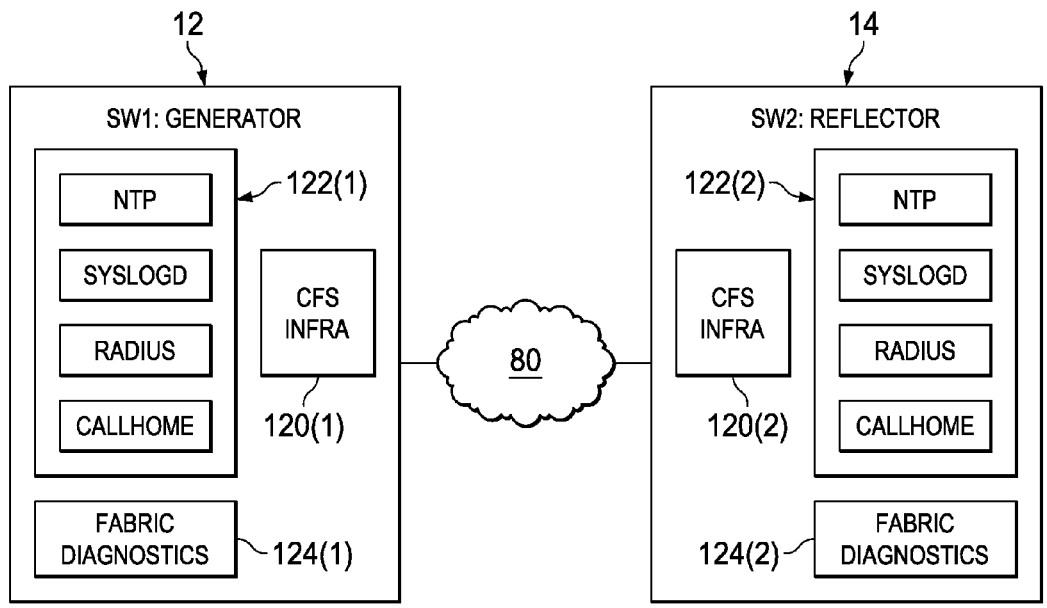
FIG. 6 is a simplified block diagram illustrating yet other example details of embodiments of the communication system.

Turning to FIG. 6, FIG. 6 is a simplified block diagram illustrating example details of an embodiment of communication system 10. Generator 12 and reflector 14 are configured with CFS infrastructure ("infra") 120(1) and 120(2), respectively that is used by various applications 122(1) and 122(2), respectively. Each application registers with the respective CFS infrastructure to enable CFS based distribution of information, such as configuration information, to peer applications in the SAN.

According to various embodiments, generator 12 and reflector 14 may be configured with respective fabric diagnostics application 124(1) and 124(2), which register with corresponding CFS infrastructure 120(1) and 120(2) to initiate link diagnostics over network 80. The registration enables fabric diagnostics application 124(1) and 124(2) to be assigned unique SAP identifiers, enabling selective routing and identification of source and destination points for CFS messages. In one embodiment, fabric diagnostic applications 124(1) and 124(2) simulate endpoints, performing FLOGIs and being assigned FCIDs. The unique SAP identifiers correspond to simulated FCIDs 70 and 72, respectively in some embodiments.

In one embodiment, the user (e.g., network administrator) instructs fabric diagnostics application 124(1) at generator 12 to initiate link diagnostics with fabric diagnostics application 124(2) at reflector 14. Fabric diagnostics application 124(2) at reflector 14 may be identified by its unique SAP identifier. Fabric diagnostics application 124(1) at generator 12 sends a control packet in CFS protocol to fabric diagnostics application 124(2) at reflector 14. Thereafter, reflector 14 configures itself according to the test mode and other parameters specified in the control packet and responds with an acknowledgement. If the acknowledgement indicates that reflector 14 can support the requested test, generator 12 generates test data packets and commences the multi-hop link diagnostics over network 80. Further analysis of the test results can indicate any potential problems with the links between endpoints connected by generator 12 and reflector 14.

Figure 7:
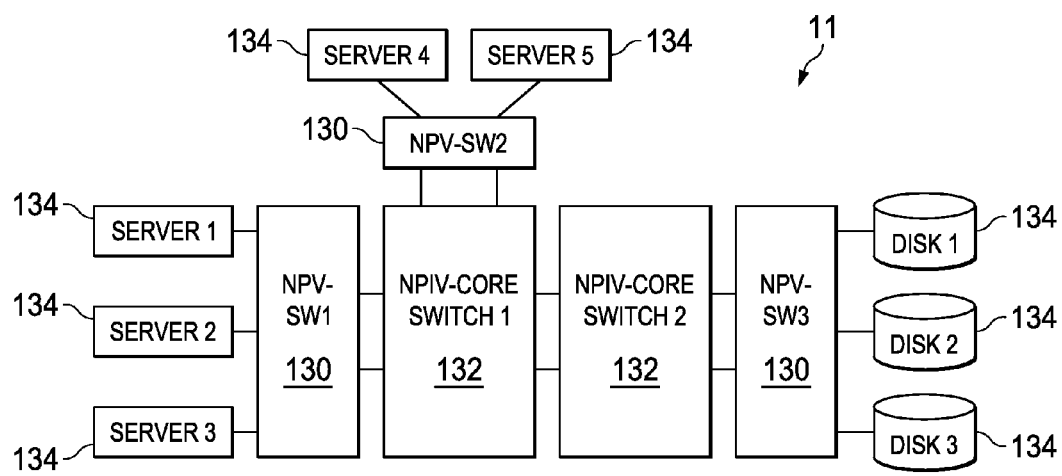
FIG. 7 is a simplified block diagram illustrating yet other example details of embodiments of the communication system.

Turning to FIG. 7, FIG. 7 is a simplified block diagram illustrating example details of an embodiment of communication system 10. Example SAN 11 is organized into edge switches 130 and core switches 132. Edge switches 130 operate in a mode called N-Port Virtualization (NPV), for example, to optimize domain space in SAN 11. Core switches 132 operate in a mode called N-Port D Virtualization (NPIV) allowing edge switches 130 to share their domain space. Various embodiments of communication system 10 provides diagnostic capability between any two core switches 132 (e.g., NPIV-Core-Switch1 to NPIV-Core-Switch2), between pairs of edge switches 130 and core switches 132 (e.g., NPV-SW1 to NPIV-Core-Switch1) and in multi-hop scenarios between endpoints 134 (e.g., server 1 to disk 3).

In general, endpoints 134 may be interconnected by one or more FC switches, including edge switches 130 and core switches 132 in SAN 11. Note that edge switches 130 and core switches 132 may differ merely in the devices to which their ports are connected. For example whereas at least some ports of edge switches 130 are connected to endpoints 134, the ports of core switches 132 are connected to other FC switches, including core or edge switches. Note that the network topology illustrated in the figure is merely as an example. Any number of FC switches and endpoints may be included in SAN 11 within the broad scope of the embodiments.

According to various embodiments, edge switches 130 and core switches 132 that are connected back-to-back may use EPP to perform link diagnostics of their new back-to-back links (e.g., NPV-SW1 may use EPP to perform link test of connection with NPIV-Core Switch 1; NPIV-Core Switch 1 may use EPP to perform link test of connection with NPIV-Core Switch 2; etc.). On the other hand, edge switches 130 may use CFS to perform link diagnostics of multi-hop connections between their respective endpoints 134 (e.g., NPV-SW1 may use CFS with NPV-SW3 to test multi-hop connections between server 1 and disk 3).

Figures 8, 9:
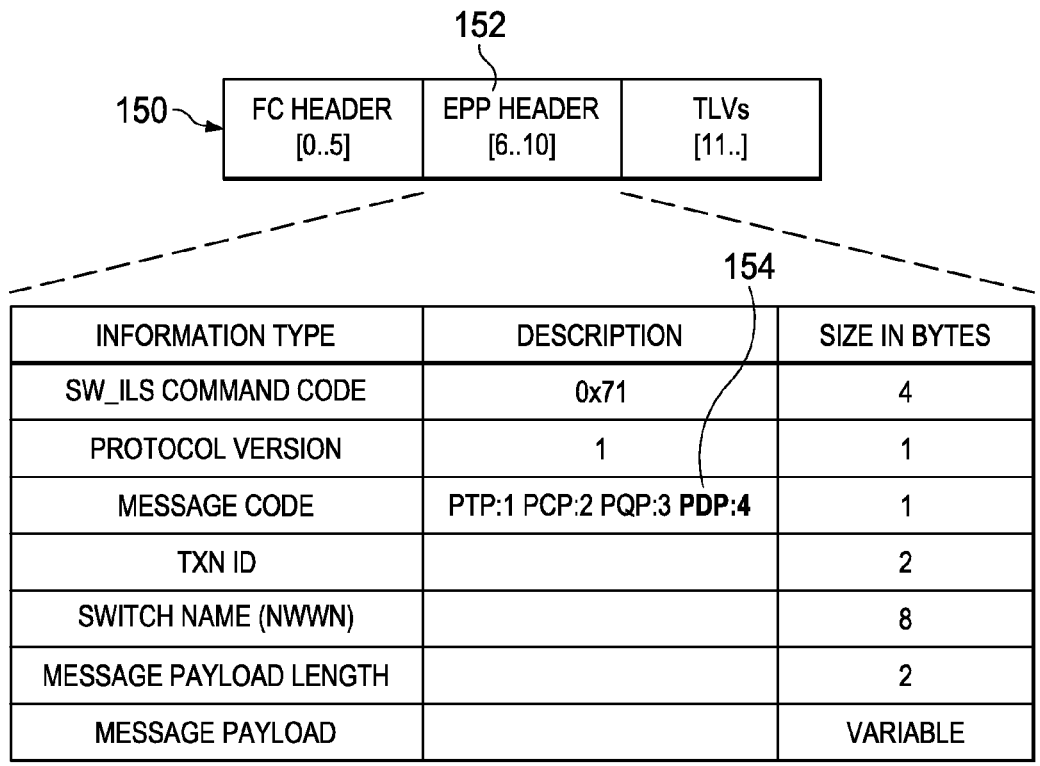
FIG. 8 is a simplified block diagram illustrating yet other example details of embodiments of the communication system.
FIG. 9 is a simplified block diagram illustrating yet other example details of embodiments of the communication system.

Turning to FIG. 8, FIG. 8 is a simplified block diagram illustrating example details of a control packet header 150 using EPP according to an embodiment of communication system 10. Control packet header 150 includes an EPP header 152. A new extension, namely, PDP with a value of 4 in field "message code" indicates that a link diagnostics test is requested.

Turning to FIG. 9, FIG. 9 is a simplified block diagram illustrating example details of a control packet 156 using EPP according to an embodiment of communication system 10. Example control packet 156 includes diagnostic TLVs indicating reflector configurations for performing appropriate link tests. Example TLVs include TestType: Latency|Traffic; TestCommand: Start|Stop; Test Duration: Number indicating milliseconds; SID: FCID of Source Switch (May be optional); DID: FCID of Destination Switch; etc. In some embodiments, reserved FCIDs of source FCID=0xffff13 and destination FCID=0xffff14 may be used for SERDES loopback tests. In some embodiments, simulated traffic tests using test data packets may use encapsulation of source FCID=0xffff15 and destination FCID=0xffff16, for example, to distinguish them from other FC traffic, so that test packets can be routed appropriately.

Turning to FIG. 10, FIG. 10 is a simplified block diagram illustrating example details of a control packet 158 using CFS according to an embodiment of communication system 10. Control packet 158 includes a destination SAP 160 and a source SAP 162. In some embodiments, destination SAP 160 corresponds to the fabric diagnostics application executing in reflector 14 and indicates (or comprises) simulated FCID 72; source SAP 162 corresponds to the fabric diagnostics application executing in generator 12 and indicates (or comprises) simulated FCID 70. The fabrics diagnostics application running in respective generator 12 and reflector 14 may generate simulated ports representing corresponding endpoints between whom the multi-hop connections are being tested.

Note that the example format of control packet 158 can also be used in response acknowledgement from reflector 14. For example, CFS message type REQ (e.g., value of 1) indicates a request message initiating the test from generator 12 to reflector 14; CFS message type ACC (e.g., value of 2) indicates that the test can be performed; CFS message type RJT (e.g., value of 3) indicates that the test cannot be performed (e.g., because reflector 14 does not have the requisite hardware for the test).

In one embodiment, some of the frame bytes (e.g., 64-67) may include a P Bit identifying a scope of distribution (e.g., 1 Physical, 0 Logical); a B Bit identifying a type of distribution (e.g., 1: Broadcast, 0: Unicast); and an L Bit with a value of 1 indicating last fragment or frame not fragmented. Note that other bits representing other indicators may be included within the broad scope of the embodiments. The application data TLVs can include the following information: TestCommand: Start Test: 1, Stop Test: 2; TestType: Multihop Throughput Test: 1; Source pWWN: 8 bytes; Destination pWWN: 8 bytes; and Destination Interface: 4 bytes. Note that the source and destination pWWN may comprise simulated ports representing corresponding endpoints and generated by the respective fabric diagnostics applications.

Figures 11, 12:
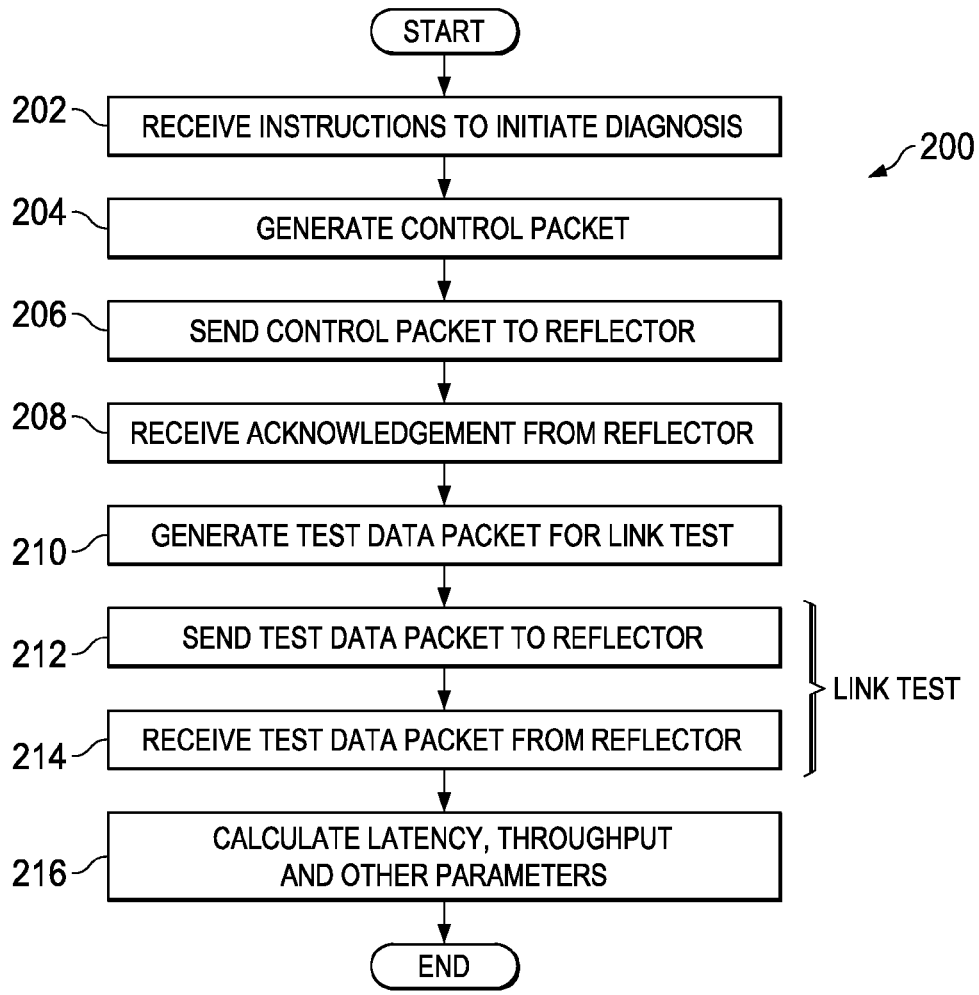
FIG. 11 is a simplified block diagram illustrating yet other example details of embodiments of the communication system.
FIG. 12 is a simplified flow diagram illustrating example operations that may be associated with an embodiment of the communication system.

Turning to FIG. 11, FIG. 11 is a simplified block diagram illustrating example details of an acknowledgement packet 164 using CFS according to an embodiment of communication system 10. Note that the frame bytes 32-end may be similar to the CFS request message, differentiated by the type of message being transmitted (e.g., CFS_ACC or CFS_RJT).

Turning to FIG. 12, FIG. 12 is a simplified flow diagram illustrating example operations 200 that may be associated with embodiments of communication system 10. At 202, generator 12 receives instructions to initiate diagnosis. In some embodiments, the instructions may be received from user input on a CLI. In other embodiments, the instructions may be received when a new link is connected to generator 12, automatically triggering a call of the fabric diagnostics application encoding the instructions. In yet other embodiments, the instructions may be received when the fabric diagnostics application encoding the instructions is called automatically based on network monitoring and other appropriate parameters (e.g., link failure detected).

At 204, control packet generator 32 at generator 12 generates control packet 60. In some embodiments, for example, where a back-to-back link between two FC switches is being diagnosed, control packet 60 may include an EPP PDP message in EPP. In other embodiments, for example, where multi-hop connections are being diagnosed, control packet 60 may include a CFS request message in CFS protocol. Control packet 60 includes a request for a specific test (e.g., latency, throughput, etc.) and certain parameters or configuration settings (e.g., PHY/MAC in loopback mode, etc.) at reflector 14 for performing the requested test. At 206, generator 12 sends control packet 60 to reflector 14. At 208, generator 12 receives acknowledgement packet 62 from reflector 14. If acknowledgement packet 62 indicates that reflector 14 cannot perform the requested test, further operations are stopped.

If acknowledgement packet 62 indicates that reflector 14 can perform the requested test, at 210, test data packet generator 34 at generator 12 generates test data packet 64 for the link test. In one embodiment, test data packet 64 is generated by MAC 28 in hardware. Generator 12 may also configure its ports and analysis engines, etc. for performing the test and analyzing the test results. At 212, generator 12 sends test data packet 64 to reflector 14. At 214, generator 12 may receive test data packet 64 back from reflector 14. Received test data packet 64 may include metadata (e.g., timestamp) according to the requested test parameters of the control packet. At 216, generator 12 may calculate appropriate network parameters, including latency, throughput, etc. Note that steps 212 to 214 comprises the link test, and may be performed repeatedly until the desired test accuracy, repeatability, etc., are achieved.

Figure 13:
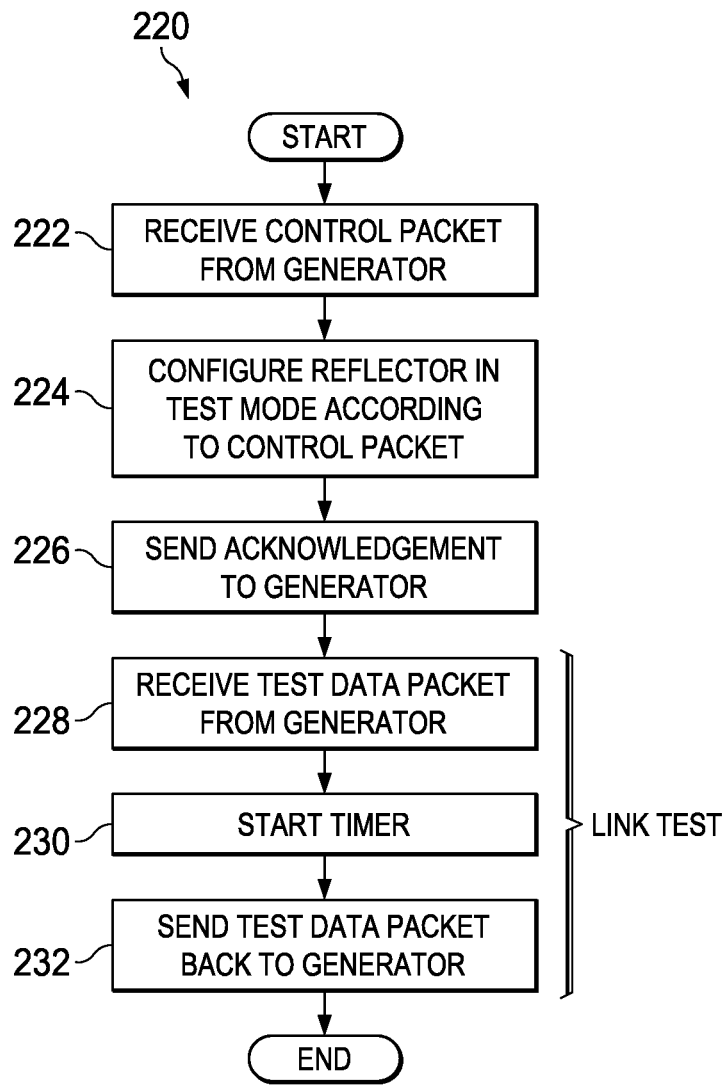
FIG. 13 is a simplified flow diagram illustrating other example operations that may be associated with an embodiment of the communication system.

Turning to FIG. 13, FIG. 13 is a simplified flow diagram illustrating example operations 220 that may be associated with embodiments of communication system 10. At 222, reflector 14 receives control packet 60 from generator 12. In some embodiments, for example, where a back-to-back link between two FC switches is being diagnosed, control packet 60 may include an EPP PDP message in EPP. In other embodiments, for example, where multi-hop connections are being diagnosed, control packet 60 may include a CFS request message in CFS protocol. At 224, reflector 14 configures itself in test mode according to the control packet information. For example, if control packet 60 requests a latency test using loopback, reflector 14 may configure MAC 48 for loopback, bypassing XBAR 46. On the other hand, if control packet 60 requests a throughput test, reflector 14 may configure XBAR 46 to forward test data packets to the same port on which the test data packets were received. In another example, if control packet 60 requests a multi-hop test, reflector 14 may simulate device FLOGIs for the requested endpoint. Various other configuration settings can be implemented according to the requested tests without departing from the broad scope of the embodiments. At 228, reflector 14 may send acknowledgement packet 62 indicating an ability or inability to perform the requested test.

If reflector 14 can perform the requested test, as indicated in acknowledgement packet 62, reflector 14 receives test data packet 64 from generator 12 at 228. At 230, reflector 14 may start timer 48. At 232, reflector 14 may send test data packet 64 with appropriate metadata (e.g., timestamp) back to generator 12. Note that steps 228 to 232 comprises the link test, and may be performed repeatedly until the desired test accuracy, repeatability, etc., are achieved.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, generator 12 and reflector 14. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, generator 12 and reflector 14 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 24, 40) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., control processors 22, 38; media access controllers 28, 48) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed in a storage area network (SAN), comprising:
    generating, by a control processor at a generator in the SAN, a control packet requesting a link test to be performed with a reflector in the SAN over a link between the generator and the reflector, wherein the generator is located in a first switch in the SAN, wherein the reflector is located in a different second switch in the SAN;
    sending the control packet to the reflector through a media access controller (MAC) of the generator;
    receiving, at the MAC of the generator, an acknowledgement from the reflector indicating ability to perform the requested link test;
    generating, at the MAC of the generator, a test data packet for the link test;
    performing the link test with the reflector; and
    analyzing, at the generator, network parameters based on results of the link test, wherein the first switch allows automatic provisioning of the link according to the analysis, wherein the link is added to a port channel between the first switch and the second switch if the analysis indicates suitable link performance, wherein the link is not added to the port channel if the analysis indicates unsuitable link performance.

2. The method of claim 1, wherein the generator and the reflector are connected back-to-back with each other, wherein the link test is performed on a back-to-back link between the generator and the reflector.

3. The method of claim 2, wherein the control packet is in Exchange Peer Parameters Protocol (EPP) with a Port Diagnostic Protocol (PDP) set to indicate the link test.

4. The method of claim 2, wherein the reflector configures another MAC at the reflector to loopback the test data packet received from the generator during the link test.

5. The method of claim 2, wherein the reflector configures a crossbar at the reflector to loopback the test data packet to a port on which the test data packet was received from the generator during the link test.

6. The method of claim 1, wherein the generator and the reflector are connected across multiple hops in the SAN, wherein the link test is performed between a first simulated endpoint at the generator and a second simulated endpoint at the reflector.

7. The method of claim 6, wherein the control packet is in Cisco Fabric Services (CFS) protocol with a source service access point (SAP) indicating the first simulated endpoint and a destination SAP indicating the second simulated endpoint.

8. The method of claim 6, wherein a fabric diagnostics application at the generator generates a first Fibre Channel Identifier (FCID) corresponding to the first simulated endpoint at the generator, wherein another fabric diagnostics application at the reflector generates a second FCID corresponding to the second simulated endpoint at the reflector.

9. The method of claim 8, wherein the MAC of the generator inserts the first FCID as a source address and the second FCID as a destination address in the test data packet before sending the test data packet to the reflector during the link test.

10. The method of claim 8, wherein the crossbar of the reflector performs a loopback of the test data packet, inserting the second FCID as the source address and the first FCID as the destination address in the test data packet before returning the test data packet back to the generator.

11. Non-transitory tangible computer readable media that includes instructions for execution, which when executed by a control processor of a generator in a SAN, is operable to perform operations comprising:
    generating a control packet requesting a link test to be performed with a reflector in the SAN over a link between the generator and the reflector, wherein the generator is located in a first switch in the SAN, wherein the reflector is located in a different second switch in the SAN;
    sending the control packet to the reflector through a MAC of the generator;
    configuring the MAC to generate a test data packet for the link test and perform the link test when an acknowledgement is received from the reflector indicating ability to perform the requested link test; and
    analyzing, at the generator, network parameters based on results of the link test, wherein the first switch allows automatic provisioning of the link according to the analysis, wherein the link is added to a port channel between the first switch and the second switch if the analysis indicates suitable link performance, wherein the link is not added to the port channel if the analysis indicates unsuitable link performance.

12. The media of claim 11, wherein the generator and the reflector are connected back-to-back with each other, wherein the link test is performed on a back-to-back link between the generator and the reflector.

13. The media of claim 12, wherein the control packet is in EPP with a PDP set to indicate the link test.

14. The media of claim 11, wherein the generator and the reflector are connected across multiple hops in the SAN, wherein the link test is performed between a first simulated endpoint at the generator and a second simulated endpoint at the reflector.

15. The media of claim 14, wherein the control packet is in CFS protocol with a source SAP indicating the first simulated endpoint and a destination SAP indicating the second simulated endpoint.

16. An apparatus in a SAN, comprising:
a generator;
a MAC;
a memory element for storing data; and
a control processor, wherein the control processor executes instructions associated with the data, wherein the control processor and the memory element cooperate, such that the apparatus is configured for:
generating, by the control processor, a control packet requesting a link test to be performed with a reflector in the SAN over a link between the generator and the reflector, wherein the reflector is located in a different apparatus in the SAN;
sending the control packet to the reflector through the MAC;
receiving, at the MAC, an acknowledgement from the reflector indicating ability to perform the requested link test;
generating, at the MAC, a test data packet for the link test;
performing the link test with the reflector; and
analyzing network parameters based on results of the link test, wherein the apparatus allows automatic provisioning of the link according to the analysis, wherein the link is added to a port channel between the apparatus and the different apparatus if the analysis indicates suitable link performance, wherein the link is not added to the port channel if the analysis indicates unsuitable link performance.

17. The apparatus of claim 16, wherein the generator and the reflector are connected back-to-back with each other, wherein the link test is performed on a back-to-back link between the generator and the reflector.

18. The apparatus of claim 17, wherein the control packet is in EPP with a PDP set to indicate the link test.

19. The apparatus of claim 16, wherein the generator and the reflector are connected across multiple hops in the SAN, wherein the link test is performed between a first simulated endpoint at the generator and a second simulated endpoint at the reflector.

20. The apparatus of claim 19, wherein the control packet is in CFS protocol with a source SAP indicating the first simulated endpoint and a destination SAP indicating the second simulated endpoint.

* * * * *